United States Patent
Asoh et al.

(10) Patent No.: US 7,334,135 B2
(45) Date of Patent: Feb. 19, 2008

(54) DATA PROTECTION SYSTEM FOR REMOVABLE RECORDING MEDIUM

(75) Inventors: Junichi Asoh, Machida (JP); Masahiko Hatori, Ebina (JP); Muzuho Tadokoro, Yamato (JP); Takashi Yomo, Fujisawa (JP)

(73) Assignee: Lenovo Singapore Pte. Ltd, Singapore (SG)

( * ) Notice: Subject to any disclaimer, the term of this patent is extended or adjusted under 35 U.S.C. 154(b) by 834 days.

(21) Appl. No.: 10/730,971

(22) Filed: Dec. 9, 2003

(65) Prior Publication Data

US 2004/0193904 A1 Sep. 30, 2004

(30) Foreign Application Priority Data

Mar. 26, 2003 (JP) ............................ 2003-085359

(51) Int. Cl.
*G06F 12/14* (2006.01)
(52) U.S. Cl. ..................................... 713/193
(58) Field of Classification Search ................. 713/193
See application file for complete search history.

(56) References Cited

U.S. PATENT DOCUMENTS

| | | | | |
|---|---|---|---|---|
| 4,386,234 A | * | 5/1983 | Ehrsam et al. | 380/281 |
| 4,816,653 A | * | 3/1989 | Anderl et al. | 235/380 |
| 4,882,474 A | * | 11/1989 | Anderl et al. | 235/380 |
| 5,222,134 A | * | 6/1993 | Waite et al. | 705/59 |
| 5,412,730 A | * | 5/1995 | Jones | 380/46 |
| 5,416,840 A | * | 5/1995 | Cane et al. | 705/52 |
| 6,529,992 B1 | * | 3/2003 | Thomas et al. | 711/1 |
| 6,898,653 B2 | * | 5/2005 | Su et al. | 710/302 |
| 7,099,957 B2 | * | 8/2006 | Cheline et al. | 709/245 |
| 7,151,832 B1 | * | 12/2006 | Fetkovich et al. | 380/210 |
| 2003/0221113 A1 | * | 11/2003 | Kupka et al. | 713/189 |
| 2004/0083378 A1 | * | 4/2004 | LeRose | 713/193 |
| 2004/0083473 A1 | * | 4/2004 | Thomas et al. | 717/174 |
| 2004/0103288 A1 | * | 5/2004 | Ziv et al. | 713/185 |
| 2004/0193871 A1 | * | 9/2004 | Seshadri | 713/154 |
| 2004/0250087 A1 | * | 12/2004 | Ray et al. | 713/189 |

FOREIGN PATENT DOCUMENTS

| | | |
|---|---|---|
| JP | 63-131169 | 6/1988 |
| JP | 07-154611 | 6/1995 |
| JP | 08-249238 | 9/1996 |
| JP | 09-160832 | 6/1997 |
| JP | 09-204330 | 8/1997 |
| JP | 09-237228 | 9/1997 |
| JP | 09-282235 | 10/1997 |
| JP | 10-241290 | 9/1998 |
| JP | 11-065934 | 3/1999 |
| JP | 2000-259275 | 9/2000 |
| JP | 2001-238521 | 9/2001 |
| JP | 2002-344441 | 11/2002 |
| JP | 2004-515001 | 5/2004 |
| WO | WO 02/44876 | 6/2002 |

* cited by examiner

*Primary Examiner*—Kambiz Zand
*Assistant Examiner*—David Garcia Cervetti
(74) *Attorney, Agent, or Firm*—Kunzler & McKenzie; Carlos Munzo-Bustamante

(57) ABSTRACT

A system for controlling an external storage device connected to a computer by accepting an operation by a user via an acceptance means and encryption means for encrypting a predetermined data file stored in the external storage device, upon a particular event, is provided, is provided.

15 Claims, 8 Drawing Sheets

[Figure 1]
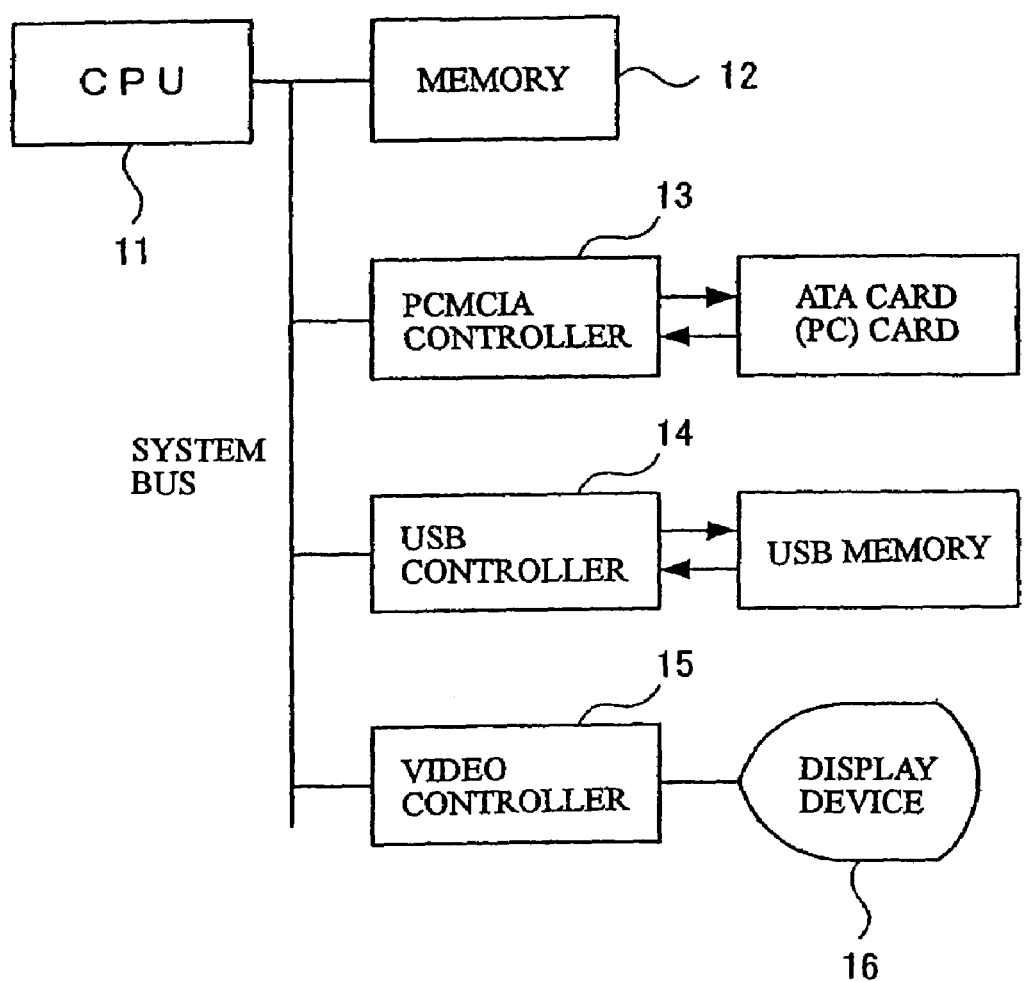

[Figure 2]
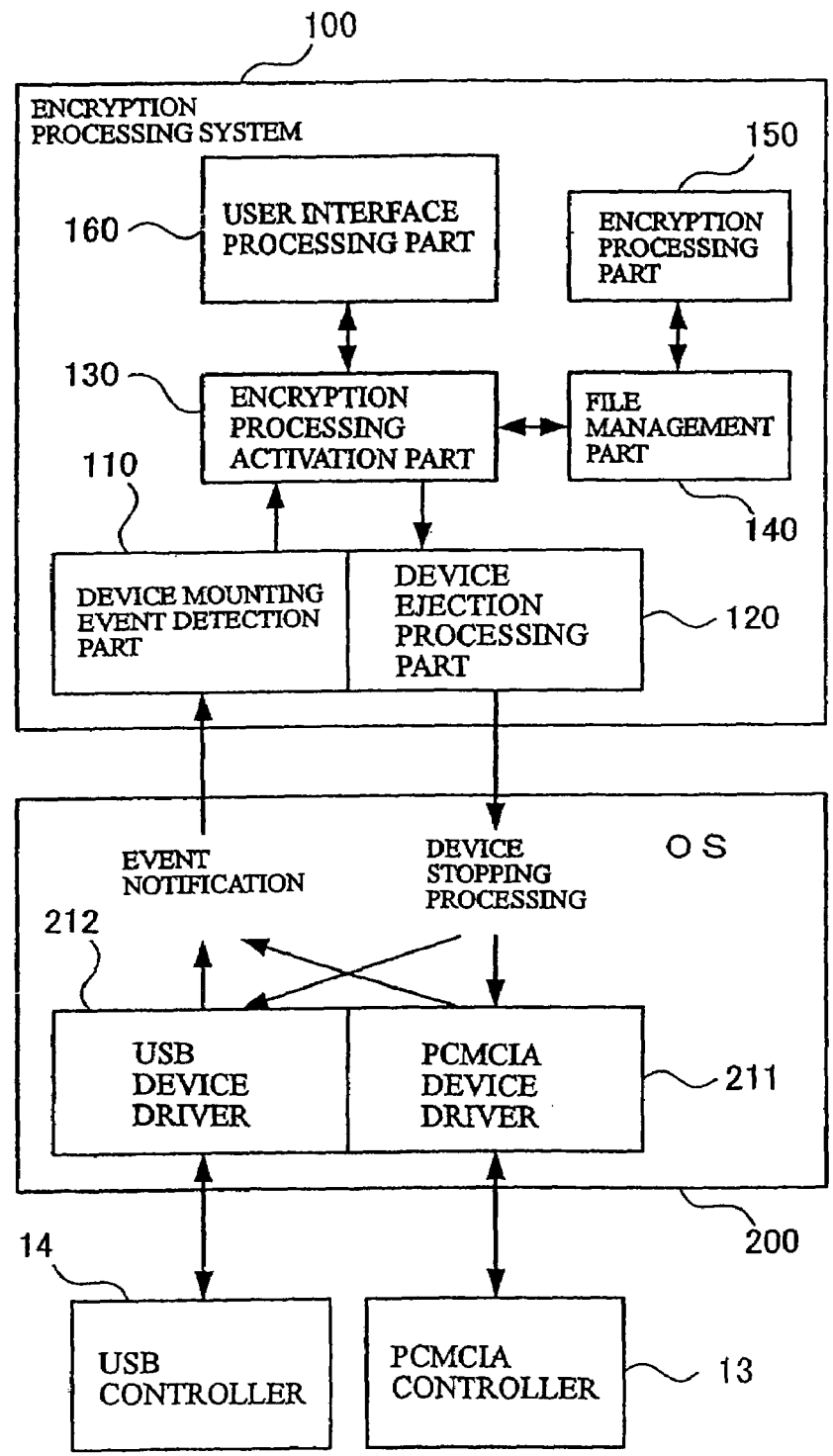

[Figure 3]
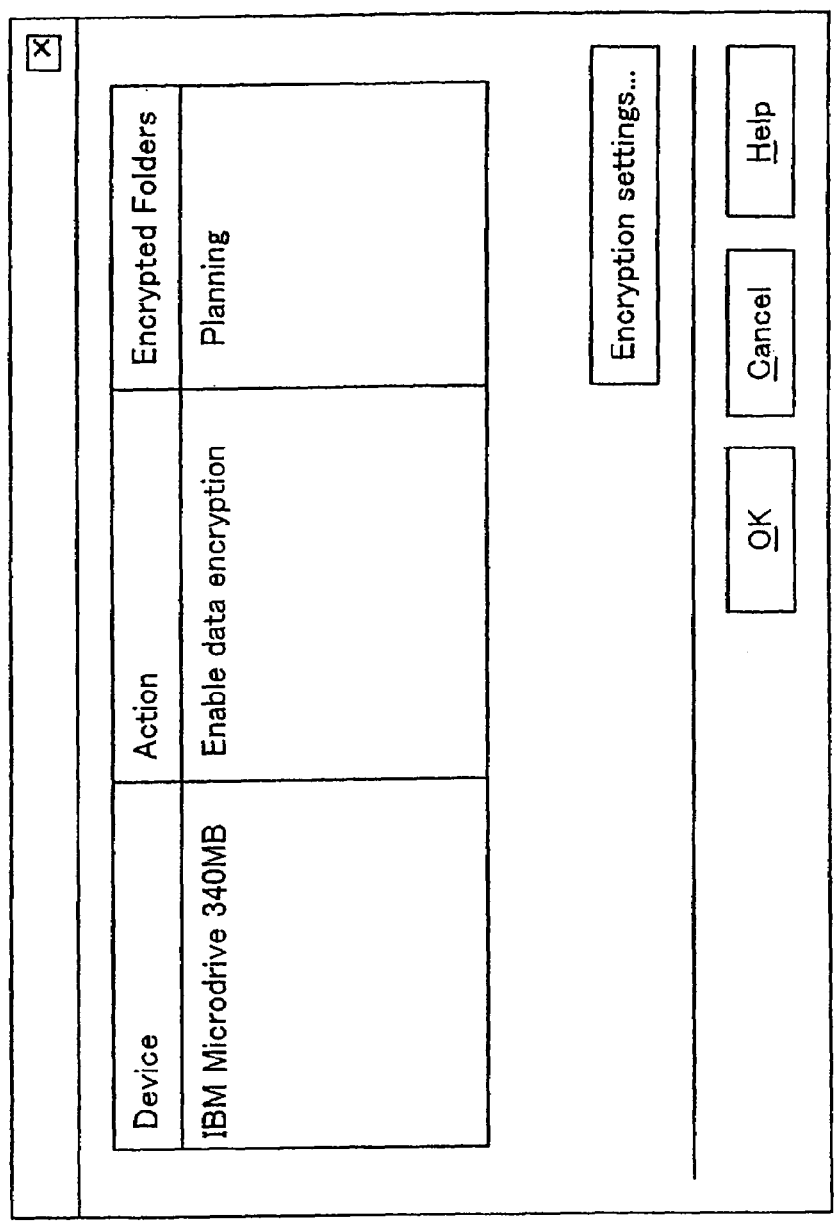

[Figure 4]
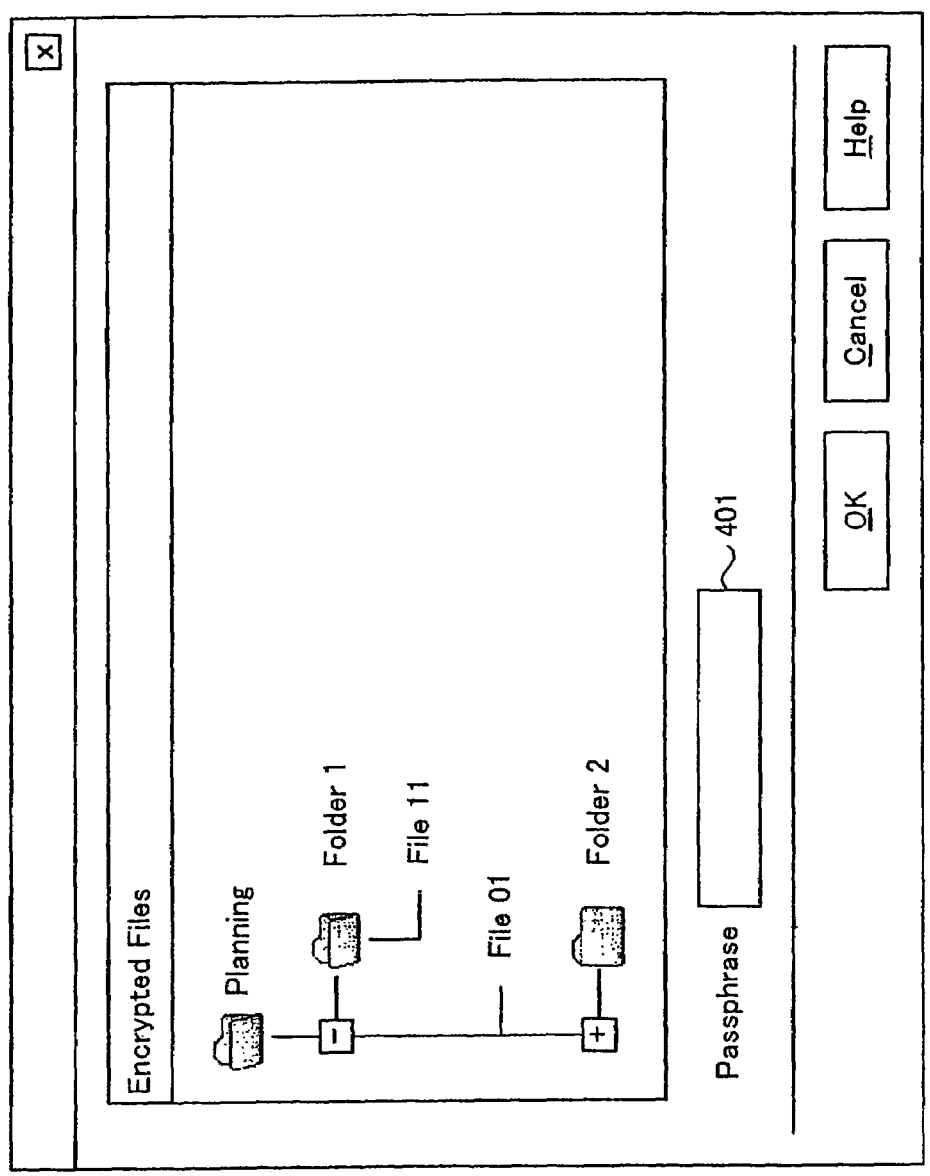

[Figure 5]
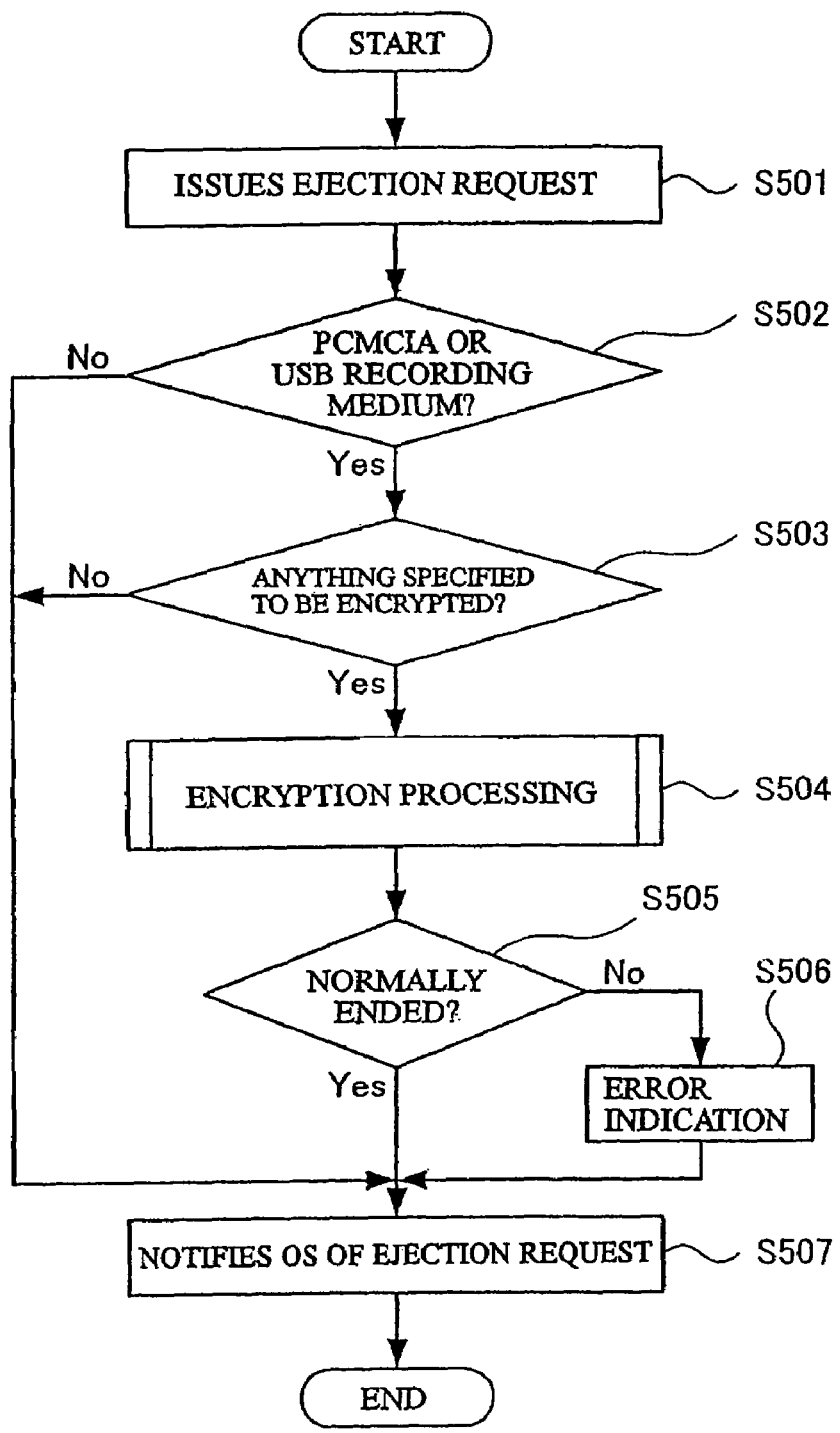

[Figure 6]
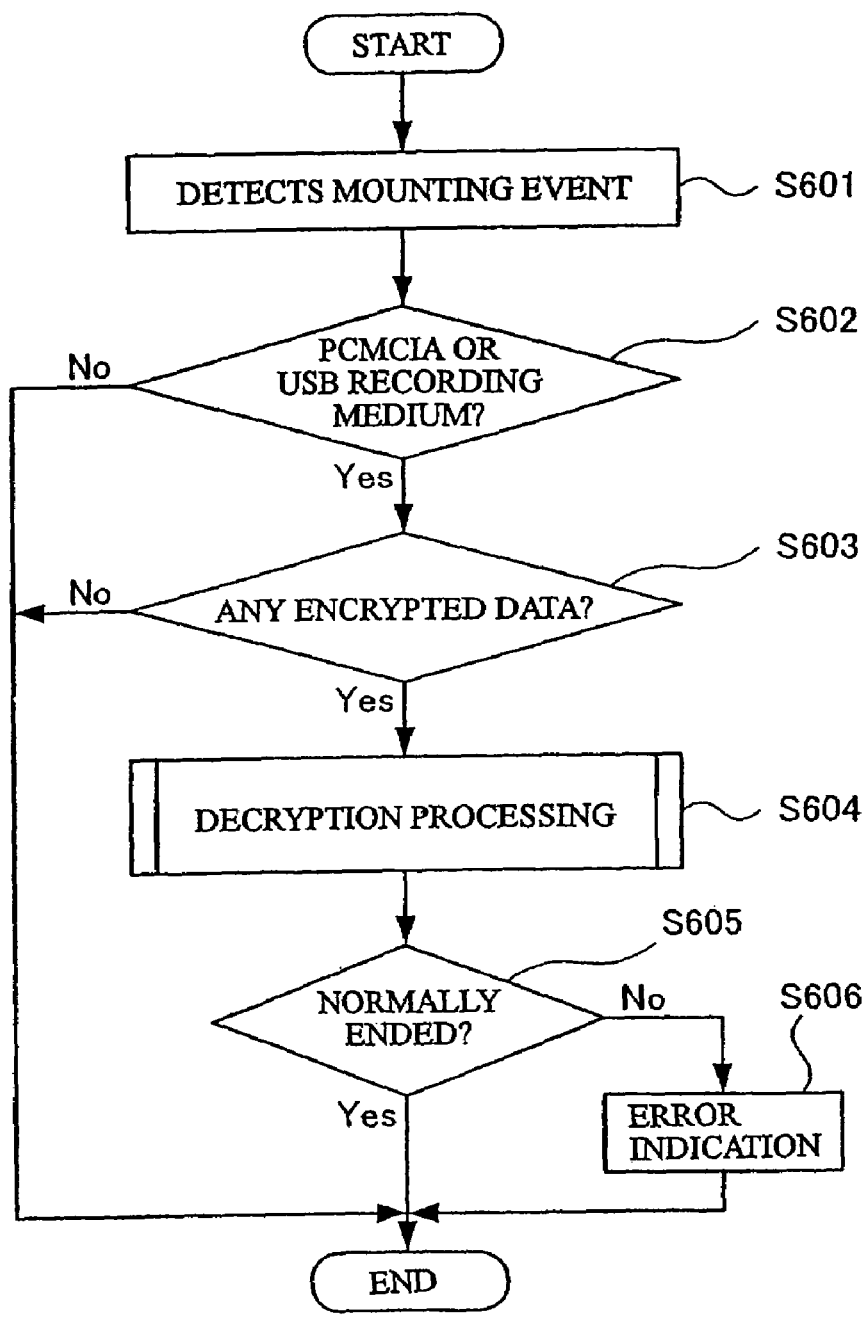

[Figure 7]
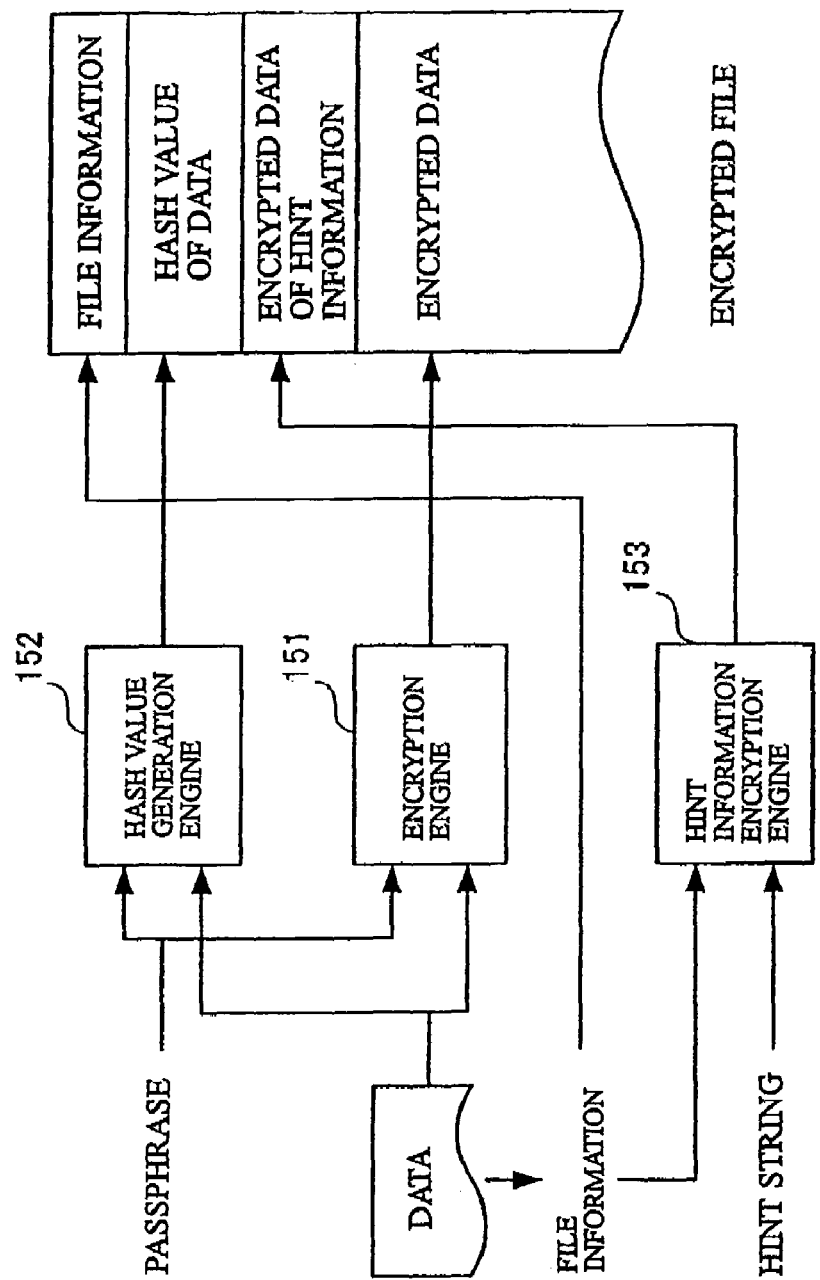

[Figure 8]
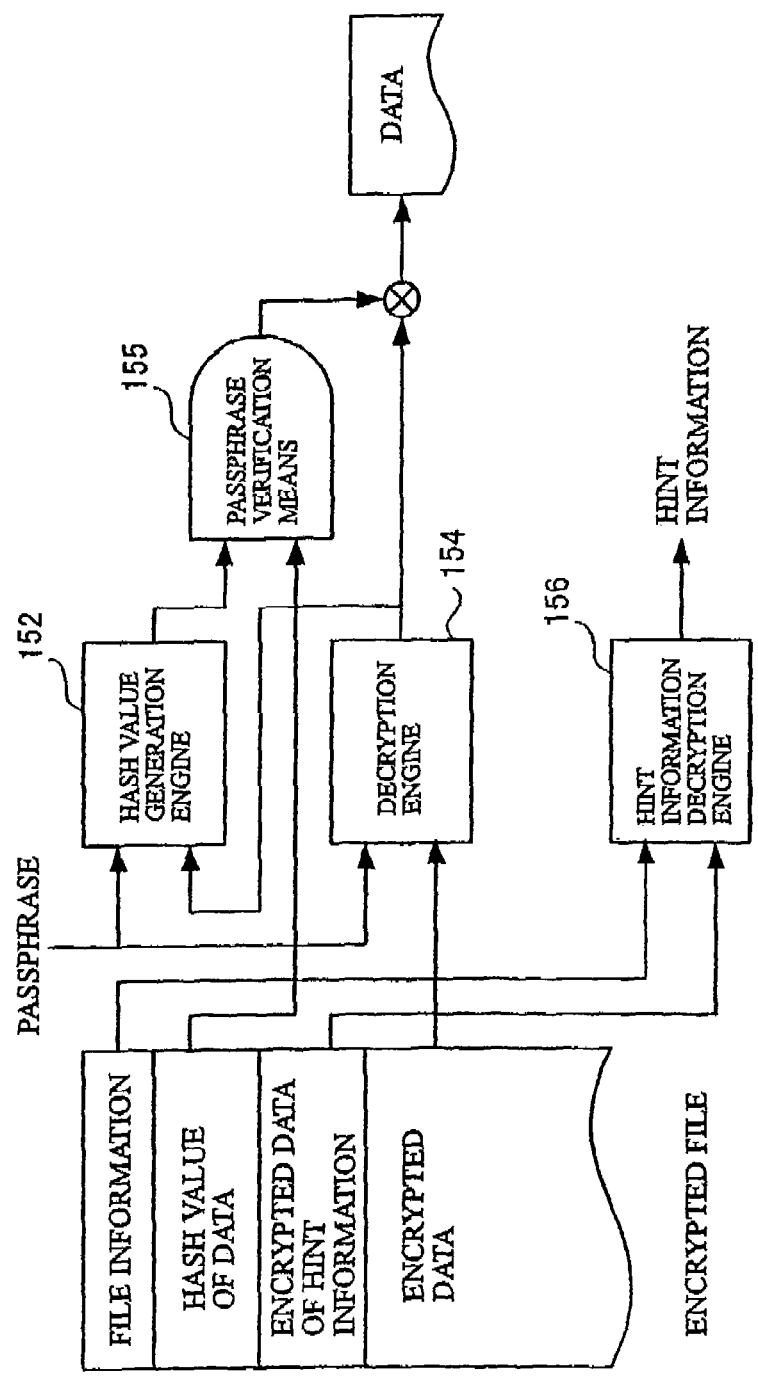

DATA PROTECTION SYSTEM FOR REMOVABLE RECORDING MEDIUM

CROSS-REFERENCE TO RELATED APPLICATIONS

This application is one of two U.S. patent applications including filed application having attorney docket no. JP9200300248US2 which was filed on the same date hereof and the teachings of which are incorporated herein by reference.

BACKGROUND OF THE INVENTION

1. Field of the Invention

The present invention relates, in general, to data security for an information processor, and in particular to data protection for attachable/detachable recording medium (removable medium).

2. Description of Related Art

It is known to use an external storage device for a computer that uses a removable medium which can be attached to and detached from a system. A removable medium has been widespread in use in part because of its superior portability and also in part as the recording medium can be taken out of a storage device. Additionally, it is known that a removable medium also provides convenience to an end user in that it can be attached to a computer for immediate use. There are various kinds of removable media such as an ATA (AT Attachment or Advanced Technology Attachment) card to be used for a PCMCIA (Personal Computer Memory card International Association) slot, a USB (Universal Serial Bus) card to be attached to a USB port for use, and a magnetic disk or an optical disk to be mounted on a dedicated disk drive (driving device) for use.

These types of removable medium can be freely attached to and detached from a storage device as described above, and can be mounted on any computer that is provided with a compatible port or a driving device, and therefore sufficient data protection measures may be required depending on the kind of data to be stored thereon.

Traditionally, setting write-protection or setting a stored data file to a hidden file have been generally implemented as data protection means for a removable medium. However, even using such means, it is possible for a malicious user to read the data since the data written in the recording medium itself is in a computer-readable format and therefore compromises confidentiality.

A method of encrypting a data file to be stored in a recording medium is one powerful means for data protection (see for example, Published Unexamined Japanese Patent Application No. 9-237228 (p.3)). According to this method, only a user who has information for decrypting an encrypted data file (decryption key) can use the data, so that sufficient data protection can be ensured.

In a common procedure for encrypting data, a user calls an encryption function of an OS (operating system) or an encryption tool (program) first, and then inputs a passphrase or performs other operations in accordance with the user interface of each tool.

Similarly, when decrypting encrypted data, a user calls a decryption function of the OS or the encryption tool first, and then inputs a passphrase or performs other operations in accordance with the user interface of each tool.

In the technology disclosed in the above-referenced Application No. 9-237228, the inputted passphrase itself is not used for encryption or decryption of data. Instead, key data generated from the passphrase is used and the key data is required when decrypting the data, for example, so that security can be further increased. The operation procedure, however, is not essentially different.

As described above, as means for protecting data stored in a removable medium, encryption of the data file is extremely effective. However, as described above, encrypting a data file using a traditional encryption function of an OS or an encryption tool requires a user to input a passphrase and perform other troublesome operations every time encryption or decryption of a data file is performed, and is not necessarily easy to use for the user.

Especially when a data file recorded on a removable medium is encrypted and decrypted at the time of attachment and detachment of the medium, it has been desired to simplify the operation required for such processing.

SUMMARY OF THE INVENTION

Accordingly, there is a need for an invention that overcomes the problems discussed above.

Therefore, an object of the present invention is to simplify the operation required for encryption and decryption of a data file and to provide data protection means suitable for a removable medium.

In order to achieve the above-mentioned object, the present invention in a particular aspect is an information processor comprised of a computer and an external storage device detachably connected via a connector provided for the computer.

The computer further includes: acceptance means for accepting an ejection request to the external storage device; and encryption means for encrypting a predetermined data file stored in the external storage device if the ejection request has been accepted by the acceptance means. The information processor can be configured to further include: device stopping means for stopping access to the external storage device for which encryption has been completed to enable the external storage to be physically removed or passphrase managing means for accepting and managing input of a passphrase used for encryption by the encryption means.

Furthermore, in accordance with another aspect of the present invention, the information processor includes: event detection means for detecting a mounting event issued when the computer has connected the external storage device to the connector; encrypted file detection means for checking whether or not an encrypted data file is stored in the external storage device which has been detected to be mounted by the event detection means; and decryption means for decrypting the encrypted data file detected by the encrypted file detection means using a preset passphrase.

Furthermore, in accordance with another further aspect of the present invention, the above object can be realized as an encryption processing system for providing encryption processing for a data file stored in an external storage device connected to a computer, which is configured as follows.

The encryption processing system includes: an acceptance means for accepting an ejection request to the external storage device connected to the computer in accordance with specifications specifying that software control should be performed, including processing to stop access to the device, when ejection is performed; and encryption means for encrypting a predetermined data file stored in the external storage device if the ejection request has been accepted by the acceptance means.

The encryption processing system can be configured to further include: decryption means for detecting that the external storage device is connected to the computer and decrypting the encrypted data file stored in the external storage device; or passphrase managing means for managing a passphrase used for encryption by the encryption means and decryption by the decryption means.

Furthermore, in accordance with still another further aspect of the present invention, the above object can be realized as a method for controlling an external storage device connected to a computer. The method for controlling an external storage device includes the steps of: accepting an operation by a user and issuing an ejection request to the external storage device connected to the computer in accordance with specifications specifying that software control should be performed, including processing to stop access to the device, when ejection is performed; and reading and encrypting a predetermined data file stored in the external storage device and storing the data file again in the external storage device, if the ejection request has been issued.

Furthermore, another method for controlling an external storage device according to the present invention includes the steps of: detecting that the external storage device is connected to the computer and checking whether or not an encrypted data file is stored in the external storage device; and, if the encrypted data file is stored in the external storage device, reading the encrypted data file, decrypting the encrypted data file using a passphrase preset and held by predetermined storage means, and storing the decrypted data file again in the external storage device.

Furthermore, the present invention can be realized as a program for controlling a computer to realize each function of the above-mentioned encryption processing system or a program for causing a computer to perform a process corresponding to each step in the above-mentioned method for controlling an external storage device. The program can be provided by storing and distributing it in a magnetic disk, an optical disk, a semiconductor memory, or any other recording medium, or by distributing it via a network.

BRIEF DESCRIPTION OF THE DRAWINGS

Other aspects, features, and advantages of the present invention will become more fully apparent from the following detailed description, the appended claims, and the accompanying drawings in which:

FIG. 1 schematically shows an example of a hardware configuration of a computer, which is suitable for realization of a data protection method according to an embodiment of the present invention;

FIG. 2 shows a functional configuration of an encryption processing system for realizing a data protection method in a computer according to an embodiment of the present invention;

FIG. 3 shows an example of a user interface screen to be used in an embodiment of the present invention;

FIG. 4 shows another example of a user interface screen to be used in an embodiment of the present invention;

FIG. 5 shows a flowchart illustrating the operation performed when a recording medium is ejected, according to an embodiment of the present invention;

FIG. 6 shows a flowchart illustrating the operation performed when a recording medium is mounted, according to an embodiment of the present invention;

FIG. 7 illustrates the operation of encryption processing by an encryption processing part according to an embodiment of the present invention; and FIG. 8 illustrates the operation of decryption processing by an encryption processing part according to an embodiment of the present invention.

DETAILED DESCRIPTION

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Embodiments of the present invention will now be described in detail with reference to the accompanying drawings, wherein the embodiments described below, however, are not limiting to the invention set forth and all combinations of features described in any of the descriptions of any embodiment are not necessarily indispensable to the solution according to the present invention.

FIG. 1 schematically shows an example of a hardware configuration for a computer, which is suitable for realization of a data protection method according to an embodiment of the present invention.

As shown in FIG. 1, a computer used in an embodiment of the present invention is provided with a CPU 11 for performing various processing and controlling activities, a memory 12 used in a program for controlling the operation of the CPU (Central Processing Unit) 11 or in processing by the CPU 11, a PCMCIA controller 13 and a USB controller 14 for controlling an external storage device, and a video controller 15 and a display device 16 for displaying a user interface screen. The PCMCIA controller 13 is provided with a slot (PCMCIA connector) to which a PC (Personal Computer) card is mounted, and an ATA card, which is a removable medium, can be mounted to the slot as an external storage device. The USB controller 14 is provided with a USB connector, and a USB memory, which is a removable medium, can be mounted to the USB connector as an external storage device.

FIG. 1 only shows an example of a hardware configuration of a computer, while it is clear to those of ordinary skill in the art that other various configurations may be possible if this embodiment is applicable. For example, in addition to devices connected via the above-described PCMCIA controller 13 and USB controller 14, a hard disk is also connected to an IDE (Integrated Device Electronics) or a SCSI (Small Computer System Interface) interface as an external storage device in general. Furthermore, input devices such as a keyboard and a mouse are connected via their own respective interfaces, though they are not particularly shown in the figure.

In the following description, the embodiment assumes the removable media to be an ATA card and a USB memory. In the PCMCIA and the USB, from a viewpoint of data protection, ejection involving software control is performed. That is, when removing an ATA card or a USB memory (hereinafter, these are called simply a recording medium without distinction), processing for ejection is performed at a software level first to store (flush) data, which is temporarily stored in the memory 12, in a recording medium and stop access to the device. After that, the ATA card or the USB memory is allowed to be physically removed from a slot or connector. Therefore, according to this embodiment, encryption of a data file is performed at this point of software control.

As for a driving device for a magnetic disk or an optical disk, software control as described above is not assumed to be performed when such a disk-shaped recording medium is removed from the driving device. However, from a viewpoint of data protection, it is preferable to remove the disk from such a device after the content of the memory 12 is flushed. In a system performing such software control, the encryption and decryption processing (hereinafter these processing activities are called an encryption processing without distinction) according to the embodiment can be directly applied even to a magnetic disk or an optical disk.

Furthermore, when removing a driving device for a disk-shaped recording medium, which is connected to a computer via a PCMCIA or USB connector, at the connector portion, the encryption processing according to this embodiment can be directly applied since the software control similar to that for an ATA card or a USB memory as described above is also performed in this case.

FIG. 2 shows a functional configuration of an encryption processing system for realizing a data protection method in a computer in an embodiment of the present invention.

As seen from FIG. 2, an encryption processing system 100 of this embodiment includes a device mounting event detection part 110 and a device ejection processing part 120 for performing processing in response to attachment/detachment of a recording medium; an encryption processing activation part 130, a file management part 140 and an encryption processing part 150 for performing encryption processing for a data file and controlling the encryption processing; and a user interface processing part 160 for providing a user with information and accepting a direction from the user.

Each of these components is realized as a function of the CPU 11, which is controlled by a program stored in the memory 12, when realized in the computer shown in FIG. 1, for example. The program controlling the CPU 11 can be provided by storing and distributing it in a magnetic disk, an optical disk, a semiconductor memory, or any other recording medium, or by distributing it via a network.

Furthermore, as shown in FIG. 2, the encryption processing system 100 is realized by an application operating on an OS (operating system) 200. The OS 200 is provided with a PCMCIA device driver 211 for controlling the PCMCIA controller 13 shown in FIG. 1 and a USB device driver 212 for controlling the USB controller 14. The OS 200 sends an event obtained from the operation of these device drivers to the encryption processing system 100, and causes each device driver to perform device stopping processing accompanying ejection of a recording medium, in response to a direction from the encryption processing system 100 (a function as device stopping means).

In the configuration of the encryption processing system 100 shown in FIG. 2, when a recording medium mounting event (an event notifying that a recording medium has been mounted on the controller) is detected from an event notification sent from the OS 200, the device mounting event detection part 110 determines whether or not decryption processing is required for a data file (or part thereof) stored in the recording medium. If there is any data for which decryption processing is required (that is, encrypted data) is included, then a request for decryption processing is sent to the encryption processing activation part 130. Presence of encrypted data can be determined from additional information such as an identifier of the data file.

The device ejection processing part 120 notifies the OS 200 of a request to stop access to the recording medium after decryption processing accompanying ejection of a recording medium, which is described later, has ended. In response to this, the contents stored in the memory 12 is flushed; access to the recording medium from a device driver is stopped; and preparation for removing (physically disconnecting) the recording medium from the controller has been completed.

When receiving a request for decryption processing, from the device mounting event detection part 110, the encryption processing activation part 130 starts encryption processing, and directs an encryption/decryption file management part to operate in order to start encryption processing as software control performed when removing the recording medium.

The file management part 140 manages the file structure of the recording medium and performs data reading and writing control for each folder or each file. It also performs post-processing, that is, describing file information such as file attributes and a date in a file header so that data read from the recording medium and decrypted is properly processed on the file system of the OS 200. Furthermore, when the recording medium is ejected, it creates an identifier for an encrypted data file and performs post-processing such as describing file information in the file header.

The encryption processing part 150 performs encryption and description of a data file. Standard algorithms such as RC4 (Rivest Cipher 4), RC5 (Rivest Cipher 5) and AES Advanced Encryption Standard) can be used as an algorithm used for encryption and decryption. The encryption processing part 150 may be not only realized with software executed by the program-controlled CPU 11 as described above but also realized by a dedicated chip (hardware) with an encryption circuit included therein. The specific operation of encryption processing is further described hereinbelow.

The user interface processing part 160 accepts an operation for encryption processing by a user and provides the user with various information. Specifically, it accepts an ejection request and activates the encryption processing activation part 130, as an operation for removing a recording medium from a controller (a function as ejection request acceptance means). This ejection request may be issued by operating an icon displayed on the display device 16 shown in FIG. 1, for example, or by operating a particular hotkey set for the keyboard in advance. When processing for stopping access to the recording medium by the OS 200 has been normally completed by software control accompanying ejection, the user interface processing part 160 displays a message on the display device 16 via the video controller 15 to the effect that the recording medium is allowed to be physically removed from the controller.

The user interface processing part 160 also displays a user interface screen described later, on the display device 16 via the video controller 15. A user can perform optional setting, such as input of a passphrase to be used for encryption and decryption and specification of a file or a folder to be encrypted, by performing operation on the user interface screen. The setting information is held in the memory 12 or a hard disk and managed by the user interface processing part 160 (a function as managing means for setting information including a passphrase).

FIGS. 3 and 4 show an example of a user interface screen.

On the user interface screen shown in FIG. 3, each of items, a recording medium to be processed (Device), whether or not to perform encryption processing (Action) and a folder to be encrypted (Encrypted Folders) can be selected. In the illustrated example, a folder "Planning" in a recording medium "IBM Microdrive 340 MB" is set to be encrypted (Enable data encryption). By clicking the button "Encryption settings . . . " shown at the lower part of the user interface screen in FIG. 3, the user interface screen in FIG. 4 is displayed.

On the user interface screen in FIG. 4, it is possible to specify in more detail which file or folder below the folder "Planning" should be encrypted. A passphrase should be inputted in an input field 401.

By performing settings for encryption processing on the user interface screen in FIGS. 3 and 4 and clicking the OK button, the settings becomes effective. In the illustrated example, when the recording medium "IBM Microdrive 340 MB" is ejected, a data file in the folder "Planning" stored in the recording medium is encrypted.

The operation of encryption processing by an encryption processing system configured as described above will be now described.

FIG. 5 shows a flowchart illustrating the operation performed when a recording medium is ejected, according to an embodiment of the present invention As shown in FIG. 5, when a request for ejection of a recording medium is issued by a user (step 501), the user interface processing part 160 accepts the request and refers to encryption processing setting information to check whether or not the request is for a recording medium under its control (that is, a PCMCIA or USB removable medium) (step 502). If it is not a recording medium under its control, the request is immediately sent to the OS 200 via the device ejection processing part 120 and the process ends (step 507).

If the recording medium related to the ejection request is under the control of the user interface processing part 160, then it is checked whether any folder or file stored in the recording medium is specified to be encrypted (step 503). If there is no such specification, then there is no need for encryption processing. Accordingly, the ejection request is sent to the OS 200 via the device ejection processing part 120, and the process ends (step 507).

If there is any folder or file specified to be encrypted, then the process is transferred to the encryption processing activation part 130 and the file management part 140 is activated. The folder or file to be encrypted is read from the recording medium and encrypted by the encryption processing part 150 (step 504). This involves post-processing such as description in the file header, performed by the file management part 140. Through these processing activities, the original data to be encrypted in the recording medium has been rewritten into encrypted data. When the encryption processing has been normally terminated, the ejection request is sent to the OS 200 via the device ejection processing part 120, and the process ends (steps 505 and 507).

On the contrary, if the encryption processing has not been normally terminated, then the user interface processing part 160 shows error indication on the display device 16 (steps 505 and 506). The ejection request is sent to the OS 200 via the device ejection processing part 120, and the process ends (step 507). In this case, the recording medium is ejected without the stored data file being encrypted.

FIG. 6 shows a flowchart illustrating the operation performed when a recording medium is mounted, in an embodiment of the present invention.

As shown in FIG. 6, when a recording medium is mounted on the PCMCIA controller 13 or the USB controller 14, a mounting event of the recording medium is detected by the device mounting event detection part 110 (step 601), and the type of the mounted recording medium is checked (step 602). If the mounted recording medium is not a PC card (ATA card) or a USB memory, then the process ends without performing anything.

On the contrary, if the mounted recording medium is a PC card or a USB memory, then it is checked whether any encrypted data, or data to be decrypted, exists among data stored in the recording medium (step 603). If there is no data to be decrypted, there is no need for performing decryption processing and therefore the process ends without performing anything.

If there is any data to be decrypted among data stored in the recording medium, then a decryption processing request is sent from the device mounting event detection part 110 to the encryption processing activation part 130; the file management part 140 is activated; and the data to be decrypted is read from the recording medium and decrypted by the encryption processing part 150 (step 604). In response to this, the file management part 140 performs post-processing such as description in the file header. Through these processing activities, the data to be decrypted in the recording medium is rewritten into decrypted data. When the decryption processing has been normally terminated, then access to the decrypted data from the OS 200 is enabled, and the process ends (step 605).

On the contrary if the decryption processing has not been normally terminated, then the user interface processing part 160 shows error indication on the display device 16 and then the process ends (steps 605 and 606). In this case, the encrypted data stored in the recording medium has not been decrypted and cannot be accessed from the OS 200 for use.

According to this embodiment, since the setting information including a passphrase is managed by the user interface processing part 160 and held by the computer as described above, it is not necessary to input the passphrase every time encryption processing is performed (though it is optionally possible to set a passphrase to be inputted each time). However, when a recording medium which has been encrypted on a different computer is mounted, it is not necessarily possible to decrypt encrypted data stored in the recording medium with the passphrase held by the computer. Accordingly, if there is encrypted data stored in a recording medium, which cannot be decrypted with a password managed by the user interface processing part 160, then the encryption processing part 150 causes the display device 16 to display a dialog message for input of a passphrase, for example, to prompt a user to input a passphrase.

FIG. 7 illustrates the operation of encryption processing by an encryption processing part 150 according to an embodiment of the present invention As shown in FIG. 7, the encryption processing part 150 is provided, as data processing means, with an encryption engine 151 for encrypting data to be encrypted, a hash value generation engine 152 for generating the hash value of the data, and a hint information encryption engine 153 for encrypting hint information to be used when a passphrase is lost. Actually, the same engine may be used as the encryption engine 151 and the hint information encryption engine 153.

As shown in FIG. 7, the encryption engine 151 inputs a passphrase and data to be encrypted, decrypts the data based on the passphrase, and outputs it (hereinafter, data encrypted by the encryption engine 151 is referred to as encrypted data, and encrypted data with predetermined header information added thereto is referred to as an encrypted file). Various algorithms such as RC2 (Rivest Cipher 2), RC4, RC6 (Rivest Cipher 6), 3DES (Triple Data Encryption Standard) and AES can be used as an encryption algorithm and they can be dynamically changed for application. By dynamically changing an encryption algorithm, security can be improved.

The hash value generation engine 152 inputs a passphrase and data to be encrypted, calculates a hash value of the data based on the passphrase and outputs it. As a hash function for calculating the hash value, MD5 (Message-Digest algorithm 5) can be used, for example.

The hint information encryption engine 153 inputs, encrypts and outputs file information such as attributes and the creation date of data to be encrypted and a predetermined hint string. The hint string is data (a character string) including information which can provide a hint for obtaining a passphrase when the user has lost the passphrase. It is not necessarily required to encrypt the hint string and add it to the encrypted file.

As shown in FIG. 7, in an encrypted file generated by processing of the encryption processing part 150, there are described file information of the original data to be encrypted, the hash value of the data (original data) outputted from the hash value generation engine 152, and the encrypted data of hint information outputted from the hint information encryption engine 153 as header information, in addition to the encrypted data outputted from the encryption engine 151.

FIG. 8 illustrates the operation of decryption processing by an encryption processing part 150 according to in an embodiment of the present invention.

As shown in FIG. 8, the encryption processing part 150 is provided with a decryption engine 154 for decrypting encrypted data, a passphrase verification means 155 for verifying validity of a passphrase, and a hint information decryption engine 156 for decrypting encrypted hint information. Actually, the same engine may be used as the decryption engine 154 and the hint information decryption engine 156.

As shown in FIG. 8, the decryption engine 154 inputs, decrypts and outputs a passphrase and encrypted data in an encrypted file. Various decryption algorithms suitable for the encryption engine 151 can be used, and they can be dynamically changed for application.

The passphrase verification means 155 inputs and compares a hash value calculated from the data decrypted by the decryption engine 154 (hereinafter referred to as decrypted data) based on the passphrase, and the hash value of the original data, which is described in the file header of the encrypted file to verify the validity. In order to calculate a hash value from decrypted data using a passphrase, the hash value generation engine 152 used for encryption is used. That is, the calculation for determining a passphrase and a hash value of decrypted data is identical to the calculation for determining a passphrase and a hash value of the original data for encryption. Accordingly, as far as the encrypted file has not been changed, the original data and the decrypted data is the same and therefore the hash values can be expected to be the same. Thus, validity of the encrypted file can be verified based on the result of comparing the hash values.

The hint information decryption engine 156 inputs and decrypts file information of the original file (the file before encryption) described in the file header of an encrypted file and encrypted data of hint information. The decrypted hint string is outputted and displayed on the display device 16, for example. This display enables a user to obtain hint information, i.e., a clue to knowing a passphrase.

As described above, according to the present invention, operation for encryption and decryption of a data file can be simplified, and data protection means suitable for a removable medium can be provided.

While the present invention has been described with respect to the embodiment, the technical scope of the present invention is not limited to the scope described above with respect to the various embodiments. Various changes and modifications can be made in the above-described embodiment. From the description of the appended claims, it is apparent that forms of the present invention including such changes or modifications are also included in the technical scope of the present invention.

What is claimed is:

1. An information processor comprising:
  a computer; and
  an external storage device detachably connected via a connector provided for the computer, the computer comprising
    acceptance means for accepting an ejection request to the external storage device; and
    encryption means for encrypting a predetermined data file stored in the external storage device in response to the ejection request being accepted by the acceptance means and in response to an encryption passphrase being stored on the computer, the passphrase having been selected by a user of the computer and saved prior to the ejection request, the predetermined data file being predetermined by the user for encryption.

2. The information processor according to claim 1, wherein the predetermined file is automatically decrypted in response to subsequent mounting of the external storage device by a computer comprising the stored passphrase and automatic encryption in response to an ejection request related to the subsequent mounting.

3. The information processor according to claim 1, further comprising passphrase managing means for accepting and managing input of a passphrase from a user, the passphrase used for encryption by the encryption means.

4. The information processor according to claim 1, wherein the encryption means is provided with multiple encryption engines used for encryption of the predetermined data file and dynamically changes the encryption engines to use them.

5. The information processor according to claim 1, wherein the connector is one of a Personal Computer Memory Card International Association (PCMCIA) connector and a Universal Serial Bus (USB) connector.

6. The information processor according to claim 1, wherein the encryption means further comprises storing hint information with the predetermined file, the hint information provided by the user when the passphrase is stored to provide a hint to the user as an aid in remembering the passphrase.

7. An information processor comprising:
  a computer; and
  an external storage device detachably connected via a connector provided for the computer, the computer comprising;
    event detection means for detecting a mounting event issued when the external storage device is connected to the connector;
    encrypted file detection means for checking whether or not an encrypted data file is stored in the external storage device which has been detected to be mounted by the event detection means; and
    decryption means for decrypting the encrypted data file detected by the encrypted file detection means using a preset passphrase, the passphrase having been selected by a user of the computer and saved on the computer prior to the mounting event.

8. The information processor according to claim 7, wherein the decryption means requires input of a passphrase when the encrypted data file cannot be decrypted with the preset passphrase.

9. The information processor according to claim 7, wherein the connector is one of a Personal Computer Memory Card International Association (PCMCIA) connector and a Universal Serial Bus (USB) connector.

10. The information processor according to claim 7, wherein the decryption means does not decrypt the data file in response to one of the decryption means failing to find a stored preset passphrase, the decryption means determining that a stored preset passphrase differs from a passphrase used to encrypt the data, and the decryption means determining that a passphrase entered by a user in response to a prompt differing from the passphrase used to encrypt the data file, the prompt provided to the user after the decryption means fails to find a stored preset passphrase or finding that a stored preset passphrase differs from the passphrase used to encrypt the data file.

11. An encryption processing system for providing encryption processing for a data file stored in an external storage device connected to a computer, the encryption processing system comprising:

acceptance means for accepting an ejection request to the external storage device connected to the computer in accordance with specifications specifying that software control should be performed, including processing to stop access to the device, when ejection is performed; and encryption means for encrypting a predetermined data file stored in the external storage device in response to the ejection request being accepted by the acceptance means and in response to an encryption passphrase being stored on the computer, the passphrase having been selected by a user of the computer and saved prior to the ejection request, the predetermined data file being predetermined by the user for encryption.

12. The encryption processing system according to claim 11, further comprising decryption means for detecting that the external storage device is connected to the computer and decrypting the encrypted data file stored in the external storage device, wherein decrypting the encrypted data file occurs in response to the decryption means determining that the encrypted data file was encrypted using the passphrase.

13. The encryption processing system according to claim 12, further comprising passphrase managing means for managing a passphrase used for encryption by the encryption means and decryption by the decryption means.

14. The encryption processing system according to claim 11, wherein said system is installed in a retail environment.

15. The encryption processing system according to claim 11, wherein said system is networked within a computer network.

* * * * *